(12) United States Patent
Kanada et al.

(10) Patent No.: US 9,630,487 B2
(45) Date of Patent: Apr. 25, 2017

(54) HYBRID SYSTEM

(71) Applicant: TOYOTA JIDOSHA KABUSHIKI KAISHA, Toyota-shi, Aichi-ken (JP)

(72) Inventors: Toshiki Kanada, Anjo (JP); Ryuji Ibaraki, Miyoshi (JP); Yuji Yasuda, Miyoshi (JP); Atsushi Tabata, Okazaki (JP); Tatsuya Imamura, Okazaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/908,203

(22) PCT Filed: Jul. 30, 2014

(86) PCT No.: PCT/IB2014/001410
§ 371 (c)(1),
(2) Date: Jan. 28, 2016

(87) PCT Pub. No.: WO2015/015276
PCT Pub. Date: Feb. 5, 2015

(65) Prior Publication Data
US 2016/0167504 A1    Jun. 16, 2016

(30) Foreign Application Priority Data

Jul. 30, 2013    (JP) .................................. 2013-158185

(51) Int. Cl.
*B60K 6/405*    (2007.10)
*B60K 6/445*    (2007.10)
(Continued)

(52) U.S. Cl.
CPC .............. *B60K 6/445* (2013.01); *B60K 6/365* (2013.01); *B60K 6/387* (2013.01); *B60K 6/405* (2013.01);
(Continued)

(58) Field of Classification Search
CPC ........ B60K 6/445; B60K 6/365; B60K 6/405; B60K 6/387; B60K 2006/381;
(Continued)

(56) References Cited

U.S. PATENT DOCUMENTS

| 2006/0166778 A1* | 7/2006 | Tabata | .................... | B60K 6/405 |
| | | | | 475/159 |
| 2007/0049445 A1* | 3/2007 | Reisch | .................... | B60K 6/387 |
| | | | | 475/5 |

(Continued)

FOREIGN PATENT DOCUMENTS

| JP | 2008-120234 A | 5/2008 |
| JP | 2008-265598 A | 11/2008 |
| JP | 2008-265600 A | 11/2008 |

*Primary Examiner* — Roger Pang
(74) *Attorney, Agent, or Firm* — Andrews Kurth Kenyon LLP

(57) ABSTRACT

A hybrid system includes an engine, a first rotary machine, a speed change device to which the engine is connected, a differential gear to which the speed change device and the first rotary machine are connected, a clutch and a brake causing the speed change device to change gears by engagement and disengagement between first plates and second plates, a casing configured to house therein these members except the engine and to be connected to the engine, and a cover wall configured to cover an opening of the casing which opening is provided on an engine side. The first rotary machine is placed on the engine side relative to the clutch and the brake, the clutch is placed inside a cylinder member of the brake, and the cylinder member is connected to a cover wall.

7 Claims, 9 Drawing Sheets

(51) Int. Cl.
  *B60K 6/365*  (2007.10)
  *B60K 6/387*  (2007.10)
  *B60K 6/547*  (2007.10)
  *F16H 3/72*  (2006.01)
  *F16H 61/00*  (2006.01)
  *F16H 37/08*  (2006.01)
  *B60K 6/38*  (2007.10)

(52) U.S. Cl.
  CPC .............. *B60K 6/547* (2013.01); *F16H 3/728* (2013.01); *B60K 2006/381* (2013.01); *B60Y 2200/92* (2013.01); *F16H 2037/0866* (2013.01); *F16H 2037/0873* (2013.01); *F16H 2061/0046* (2013.01); *F16H 2200/201* (2013.01); *F16H 2200/2035* (2013.01); *F16H 2200/2097* (2013.01); *Y02T 10/6239* (2013.01); *Y02T 10/76* (2013.01); *Y10S 903/911* (2013.01); *Y10S 903/919* (2013.01)

(58) Field of Classification Search
  CPC ............... F16H 3/728; F16H 2200/201; F16H 2200/2035; Y10S 903/911; Y02T 10/6239

USPC ............................................ 475/5; 74/606 R
See application file for complete search history.

(56) References Cited

U.S. PATENT DOCUMENTS

| | | | |
|---|---|---|---|
| 2007/0175726 A1* | 8/2007 | Combes | B60K 6/40 192/48.614 |
| 2007/0289833 A1* | 12/2007 | Chapelon | B60K 6/387 192/48.1 |
| 2010/0105519 A1* | 4/2010 | Kasuya | B60K 6/387 477/5 |
| 2011/0301796 A1* | 12/2011 | Ohashi | B60K 6/387 701/22 |
| 2013/0062980 A1* | 3/2013 | Kuwahara | B60K 6/40 310/78 |
| 2013/0090202 A1 | 4/2013 | Hiraiwa | |
| 2016/0169374 A1* | 6/2016 | Kanada | B60K 6/387 475/5 |

* cited by examiner

FIG. 4

| | | | CL1 | BK1 | MG1 | MG2 |
|---|---|---|---|---|---|---|
| EV | FORWARD MOVEMENT / REARWARD MOVEMENT | SINGLE MOTOR WITHOUT ENGINE BRAKING | | | G | M |
| EV | FORWARD MOVEMENT / REARWARD MOVEMENT | SINGLE MOTOR WITH ENGINE BRAKING | △ | △ | G | M |
| EV | FORWARD MOVEMENT / REARWARD MOVEMENT | DOUBLE MOTOR | O | O | M | M |
| HV | FORWARD MOVEMENT | HIGH | | O | G | M |
| HV | FORWARD MOVEMENT | LOW | O | | G | M |
| HV | REARWARD MOVEMENT | LOW | O | | G | M |

HYBRID SYSTEM

CROSS-REFERENCE TO RELATED APPLICATIONS

This is a national phase application based on the PCT International Patent Application No. PCT/IB2014/001410 filed Jul. 30, 2014, claiming priority to Japanese Patent Application No. 2013-158185 filed Jul. 30, 2013, the entire contents of both of which are incorporated herein by reference.

BACKGROUND OF THE INVENTION

1. Field of the Invention

The present invention relates to a hybrid system for a hybrid vehicle using an engine and a rotary machine as power sources.

2. Description of Related Art

As such a type of hybrid system, there has been known a hybrid system including an engine, two rotary machines, and a power split device (a planet gear mechanism). In the hybrid system, a rotating shaft of the engine, a rotating shaft of a first rotary machine, a rotating shaft of a second rotary machine, and driving wheels are connected to each rotating element of the power split device. For example, in a hybrid system described in Japanese Patent Application Publication No. 2008-120234 (JP 2008-120234 A), a planet gear mechanism operable as a speed change unit is placed between an engine and a power split device. The speed change unit includes: a rotating element connected to a rotating shaft of an engine; and a rotating element connected to a rotating element (except for rotating elements connected to a rotating shaft of a first rotary machine, a rotating shaft of a second rotary machine, and driving wheels) of the power split device. Further, the hybrid system of JP 2008-120234 A is provided with an engaging device (a switching device) configured to switch the speed change unit between a state where a differential rotation is performable and a state where the differential rotation is not performable, so as to change a transmission gear ratio of the speed change unit. Note that hybrid systems described in Japanese Patent Application Publication No. 2008-265598 (JP 2008-265598 A) and Japanese Patent Application Publication No. 2008-265600 (JP 2008-265600 A) are each provided with a clutch (a fixed element) configured to fix a rotating shaft of an engine. In such a hybrid system, when the clutch is engaged to stop a rotation of the rotating shaft of the engine, it is possible to perform traveling by use of both powers from a first rotary machine and a second rotary machine. Accordingly, in this hybrid system, the engine, the first rotary machine, the second rotary machine, and the clutch are controlled according to a requested driving force, and a power source to be used for traveling is selected therefrom. Further, in the hybrid system of JP 2008-265600 A, at the time of traveling by use of both powers from the first rotary machine and the second rotary machine, torque split between the first rotary machine and the second rotary machine is determined according to respective efficiencies of the first rotary machine and the second rotary machine.

SUMMARY OF THE INVENTION

In a vehicle, such as a FR (Front engine Rear wheel drive) vehicle, employing a longitudinal engine layout, a power transmitting apparatus such as a speed change gear is placed below a body floor panel in a state where the power transmitting apparatus is covered with a floor tunnel (a tunnel portion of the body floor panel). Accordingly, in a case where a hybrid system having the configuration as described in JP 2008-120234 A is mounted in this type of vehicle, the first rotary machine, the second rotary machine, the speed change unit, and the power split device, the engaging device, and the like are placed under the floor tunnel. Here, generally, the floor tunnel has a diameter gradually decreased toward a vehicle rear side in accordance with a shape of a casing for the speed change gear. In view of this, in a case where the hybrid system as described above is mounted, it is desirable that the first rotary machine having a large outside diameter among component parts of the hybrid system be placed on a vehicle front side in the floor tunnel. However, in the power transmitting apparatus of such a hybrid system, the hydraulically driven engaging device should be placed on a vehicle rear side relative to the first rotary machine along with the aforementioned placement of the first rotary machine. In a case where a plurality of engaging devices should be mounted, mountability of the engaging devices may be decreased.

The present invention provides a hybrid system configured such that an engaging device is mountable at the time when a rotary machine is placed on a vehicle front side.

An aspect of the present invention relates to a hybrid system. The hybrid system includes an engine, a rotary machine, a speed change device, a differential device, a first engaging device, a second engaging device, a casing, and a cover wall. The engine includes a rotating shaft. The rotary machine includes a rotor. The speed change device includes an input shaft and an output shaft. The input shaft is connected to the rotating shaft. The differential device includes a plurality of differential rotation elements including a first differential rotation element and a second differential rotation element. The first differential rotation element is connected to the output shaft. The second differential rotation element is connected to the rotor. The differential device is configured such that the plurality of differential rotation elements is differentially rotatable relative to each other. The first engaging device includes a first engaging member and a second engaging member. The first engaging device is configured to shift gears of the speed change device by engaging or disengaging the first engaging member with or from the second engaging member. The second engaging device includes a third engaging member and a fourth engaging member. The second engaging device is configured to shift gears of the speed change device by engaging or disengaging the third engaging member with or from the fourth engaging member. The second engaging device includes a cylinder member. The fourth engaging member of the second engaging device is disposed in the cylinder member. The cylinder member is configured to support the first engaging device. The casing is configured to house the rotary machine, the speed change device, the differential device, the first engaging device, and the second engaging device. The casing is connected to the engine. The casing has an opening on an engine side. The rotary machine is disposed on the engine side relative to the first engaging device and the second engaging device. The cover wall is configured to cover the opening. The cover wall is connected to the cylinder member.

In the hybrid system, the first engaging device may be disposed inside the cylinder member of the second engaging device in a radial direction.

The hybrid system may include a first bearing. The first bearing may be disposed between the rotor and the cylinder member. The rotor of the rotary machine may be configured to cover the cylinder member of the second engaging device in a radial direction. The cylinder member may include a tubular portion. The tubular portion and the rotor may be configured to be supported by each other via the first bearing. The cover wall may be connected to the tubular portion of the cylinder member.

The hybrid system may include a spline joint. The spline joint may be provided between the tubular portion and the cover wall. Further, in the hybrid system, the tubular portion and the cover wall may be connected to each other via splines provided on the tubular portion and the cover wall.

The hybrid system may include a second bearing. The second bearing may be disposed between the tubular portion and the input shaft of the speed change device. The tubular portion may be configured to cover the input shaft in the radial direction. The tubular portion and the input shaft may be configured to be supported by each other via the second bearing.

In the hybrid system, the rotor of the rotary machine may be connected to the second differential rotation element of the differential device via a connecting member. The connecting member may be disposed outside the first engaging device and the second engaging device in a radial direction.

In the hybrid system according to the present invention, the first engaging device is supported by the cylinder member of the second engaging device, and the cylinder member is connected to the cover wall placed on the engine side relative to the rotary machine. Accordingly, even if the rotary machine is placed closer to the engine side, it is possible to place the first and second engaging devices at a position farther from the engine than the rotary machine. As a result, in the hybrid system, it is possible to improve mountability of the first and second engaging devices at the time when the rotary machine is placed on the engine side.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a view illustrating an operation engagement table of the hybrid system according to the present invention;

DETAILED DESCRIPTION OF EMBODIMENTS

The following describes an embodiment of a hybrid system according to the present invention in details based on the drawings. Note that the embodiment is not intended to limit this invention.

The following describes the embodiment of the hybrid system according to the present invention with reference to FIGS. 1 to 10.

Figure 1:
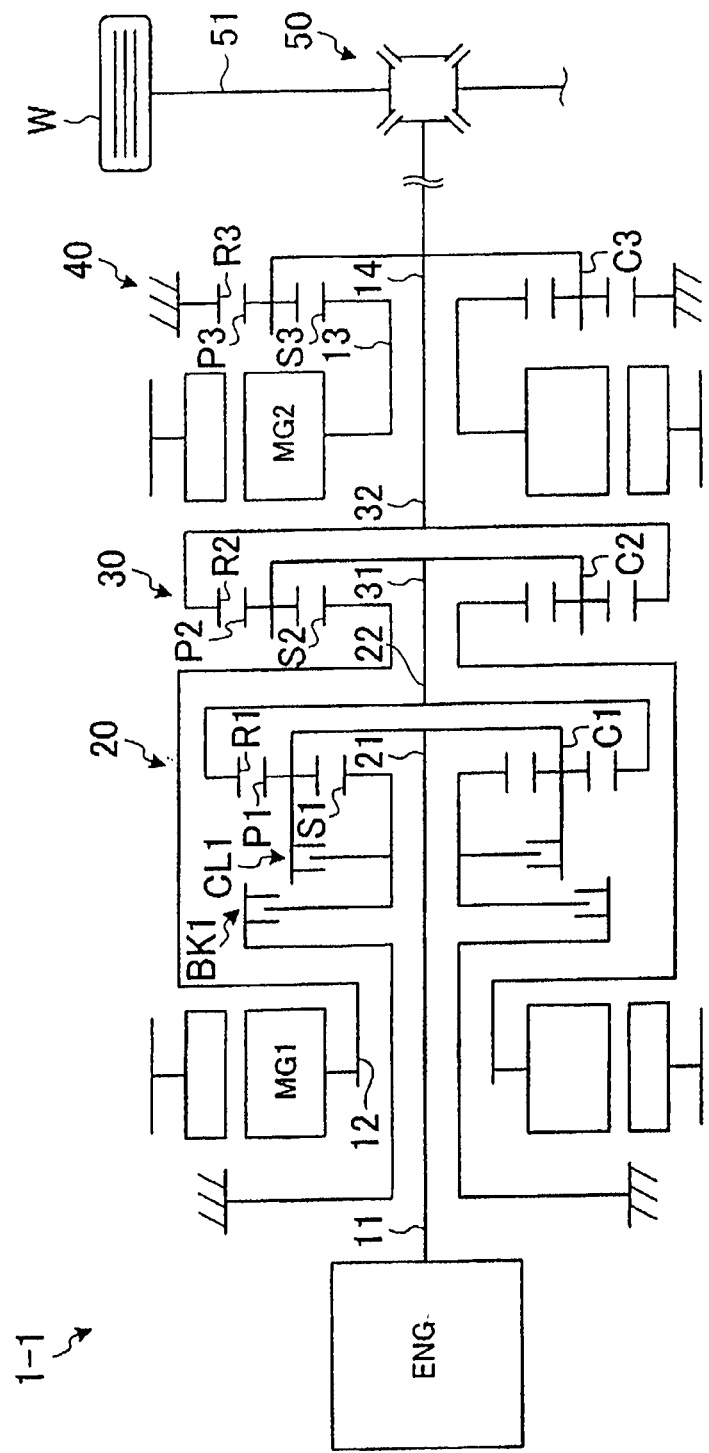
FIG. 1 is a skeleton diagram illustrating a configuration of an embodiment of a hybrid system according to the present invention.
Figure 2:
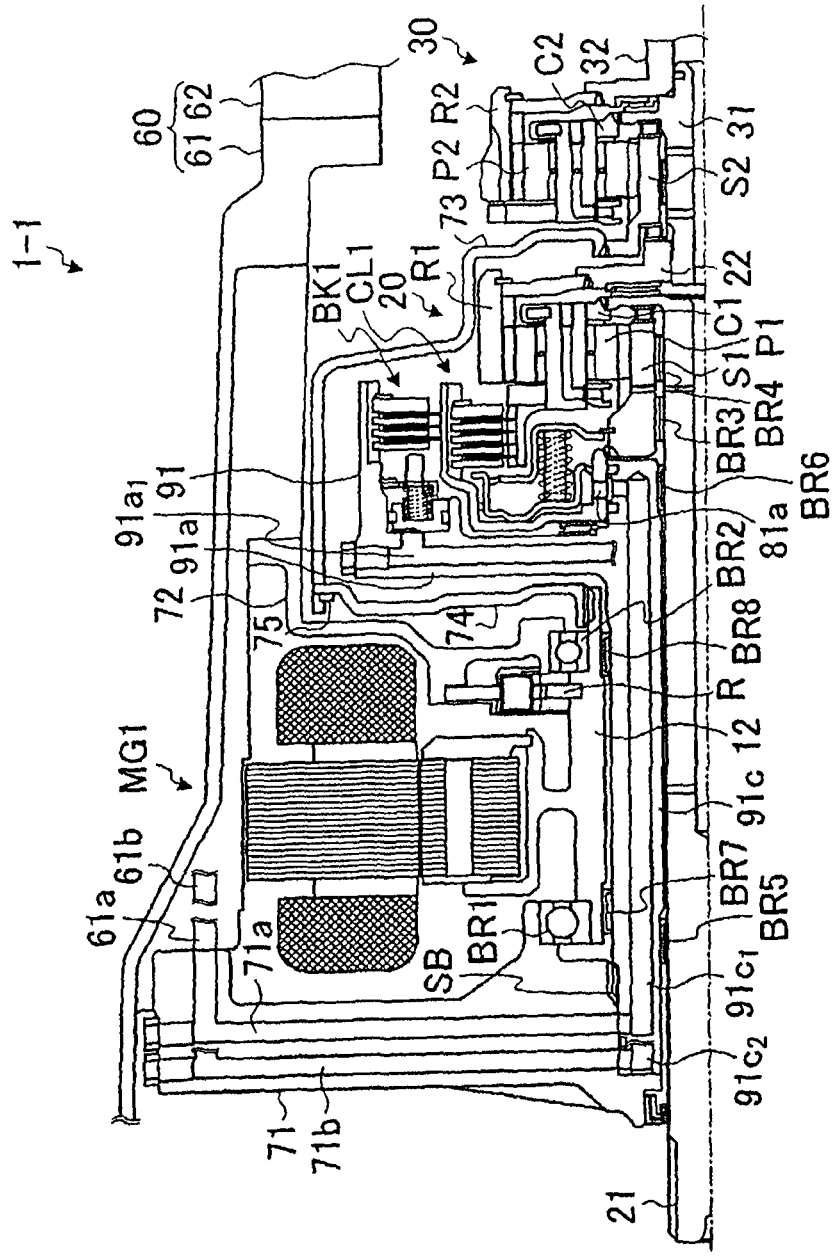
FIG. 2 is a sectional view illustrating a structure in a casing in the hybrid system in the embodiment.

A reference sign 1-1 in FIGS. 1 and 2 indicates the hybrid system of the present embodiment.

The hybrid system 1-1 includes an engine ENG, a first rotary machine MG1, and a second rotary machine MG2 as power sources. Further, the hybrid system 1-1 is provided with a power transmitting apparatus that is able to perform a power transmission between these power sources and a power transmission between each of the power sources and a driving wheel W. The power transmitting apparatus includes a speed change device 20 and a differential device 30 connected in series to each other.

The hybrid system 1-1 is mounted in a vehicle, such as a FR vehicle, employing a longitudinal layout of the engine ENG. Accordingly, the hybrid system 1-1 is a uniaxial type in which an engine rotating shaft 11, a rotating shaft (hereinafter referred to as "MG1 rotating shaft") 12 of the first rotary machine MG1, a rotating shaft (hereinafter referred to as "MG2 rotating shaft") 13 of the second rotary machine MG2, a rotational central axis of the speed change device 20, and a rotational central axis of the differential device 30 are placed in a concentric manner. In the hybrid system 1-1, the engine ENG, the first rotary machine MG1, the speed change device 20, the differential device 30, and the second rotary machine MG2 are placed in this order from a vehicle front side in a concentric manner. Although not illustrated in FIG. 2, the engine ENG is placed on a left side on a plane of paper, and the second rotary machine MG2 is placed on a right side on the plane of paper.

The engine ENG is an engine such as internal combustion engine or an external combustion engine, and outputs a mechanical power (engine torque) from the engine rotating shaft 11. An operation of the engine ENG is controlled by an electronic control unit (hereinafter referred to as "engine ECU") 101 illustrated in FIG. 3.

The first rotary machine MG1 is a motor generator having a function as an electric motor (a motor) and a function as a power generator (a generator), and generating an output torque (hereinafter referred to as "MG1 torque") to the MG1 rotating shaft 12. The second rotary machine MG2 is the same as this, and generates an output torque (hereinafter referred to as "MG2 torque") to the MG2 rotating shaft 13. Operations of the first and second rotary machines MG1, MG2 are controlled by an electronic control unit (hereinafter referred to as "MGECU") 102 illustrated in FIG. 3.

The speed change device 20 includes a first power transmission element configured to perform power transmission to and from the engine ENG, and a second power transmission element configured to perform power transmission to and from the differential device 30. The speed change device 20 is able to change a speed of a rotation input into one of the power transmission elements and to transmit the rotation to the other power transmission element.

Here, the speed change device 20 exemplified herein includes a planetary gear unit. The planetary gear unit thus exemplified is a single-pinion type planet gear mechanism, and includes a sun gear S1, a ring gear R1, a plurality of pinion gears P1, and a carrier C1, as a plurality of rotating elements (hereinafter referred to as "speed-changing rotating elements") that is differentially rotatable. In the speed change device 20, any one of the sun gear S1, the ring gear R1, and the carrier C1 is connected to the engine ENG, and one of the others is connected to the differential device 30. In this embodiment, the engine rotating shaft 11 is connected to the carrier C1 via the rotating shaft 21 so as to be rotatable integrally therewith. Accordingly, in this embodiment, the carrier C1 or the rotating shaft 21 of the carrier C1 serves as the first power transmission element described above. Further, in this embodiment, the differential device 30 is connected to the ring gear R1 via a rotating shaft 22. The ring gear R1 or the rotating shaft 22 of the ring gear R1 serves as the second power transmission element described above, and is connected to one of differential rotation elements (the carrier C2 herein, as will be described later) of the differential device 30 so as to be rotatable integrally therewith.

The hybrid system 1-1 is provided with a shift control apparatus configured to operate the speed change device 20 (that is, the speed change device 20 is caused to change gears). The shift control apparatus changes a transmission speed ratio or a gear position of the speed change device 20, and also switches the speed change device 20 between a state where power transmission is performable and a neutral state. More specifically, the shift control apparatus includes two engaging devices configured to adjust a rotational state and a stop state of a predetermined speed-changing rotating element in the speed change device 20. In this embodiment, a clutch CL1 and a brake BK1 are provided as the engaging devices.

The clutch CL1 is a hydraulically driven clutch device configured to adjust an engagement and disengagement state between the sun gear S1 and the carrier C1. The clutch CL1 includes a first engaging member configured to rotate integrally with the sun gear S1, and a second engaging member configured to rotate integrally with the carrier C1. The clutch CL1 is a frictional engagement type in which the clutch CL1 is switched among a disengaged state, a half-engaged state, and a completely engaged state by control of the HVECU 100 as will be described later. In the disengaged state, a connection between the first engaging member and the second engaging member is separated, so that the sun gear S1 and the carrier C1 are rotatable relative to each other, thereby allowing the planet gear mechanism of the speed change device 20 to rotate differentially. In the half-engaged state, while the first engaging member and the second engaging member are being slid with each other, the sun gear S1 and the carrier C1 are allowed to rotate relative to each other in a range where the first engaging member and the second engaging member do not rotate integrally. In the completely engaged state, the first engaging member is integrated with the second engaging member, so that the sun gear S1 and the carrier C1 are not rotatable relative to each other, thereby prohibiting a differential rotation of the planet gear mechanism in the speed change device 20. Note that in a case where the clutch CL1 is a meshing type, the clutch CL1 is controlled to be switched between the disengaged state and the completely engaged state.

The brake BK1 is a hydraulically driven braking device configured to regulate a rotation of the sun gear S1. The brake BK1 includes a third engaging member rotating integrally with the sun gear S1, and a fourth fixed engaging member fixed to a vehicle-body side (e.g., a case or the like of the power transmitting apparatus). The brake BK1 is a frictional engagement type in which the brake BK1 is switched among a disengaged state, a half-engaged state, and a completely engaged state by control of the HVECU 100. In the disengaged state, a connection between the third engaging member and the fourth engaging member is separated, thereby allowing the sun gear S1 to rotate. In the half-engaged state, while the third engaging member and the fourth engaging member are being slid with each other, the sun gear S1 is allowed to rotate in a range where the third engaging member and the fourth engaging member do not rotate integrally. In the completely engaged state, the third engaging member is integrated with the fourth engaging member, thereby prohibiting the sun gear S1 from rotating. Note that, in a case where the brake BK1 is a meshing type, the brake BK1 is controlled to be switched between the disengaged state and the completely engaged state.

When the clutch CL1 and the brake BK1 are both in the disengaged state, the speed change device 20 is in a neutral state where power transmission is not performable between input and output sides (between the first power transmission element and the second power transmission element). In the neutral state, the power transmission between the engine ENG and the differential device 30 is blocked.

In the meantime, in the speed change device 20, when either one of the clutch CL1 and the brake BK1 is engaged, the power transmission between the input and output sides is performable, so that a power is transmittable between the engine ENG and the differential device 30.

For example, when the clutch CL1 is disengaged and the brake BK1 is completely engaged, the speed change device 20 performs a differential rotation in a state where the sun gear S1 is fixed (a rotation stop state), so as to increase that rotation of the engine ENG which is input into the carrier C1 and to output the rotation from the ring gear R1. That is, the speed change device 20 in this case is in an overdrive (OD) state where the transmission speed ratio is smaller than 1. In the meantime, when the clutch CL1 is completely engaged and the brake BK1 is disengaged, the speed change device 20 is in a differential rotation prohibiting state where all the speed-changing rotating elements rotate integrally with each other, and the input and output sides (the carrier C1 and the ring gear R1) are in a directly-connected state. Hereby, the speed change device 20 outputs that rotation of the engine ENG which is input into the carrier C1 from the ring gear R1 at a constant speed. That is, the transmission speed ratio of the speed change device 20 in this case is 1. As such, when the clutch CL1 is disengaged and the brake BK1 is completely engaged, the speed change device 20 is shifted to a gear position on a high speed side (a high-speed gear position), and when the clutch CL1 is completely engaged and the brake BK1 is disengaged, the speed change device 20 is shifted to a gear position on a low speed side (a low-speed gear position). In the hybrid system 1-1, since the transmission speed ratio of the speed change device 20 is 1 or less as such, it is not always necessary to obtain a high torque of the first rotary machine MG1.

The differential device 30 includes a planetary gear unit. The planetary gear unit exemplified herein is a single-pinion type planet gear mechanism, and includes a sun gear S2, a ring gear R2, a plurality of pinion gears P2, and a carrier C2, as a plurality of rotating elements (hereinafter referred to as "differential rotation element") that are differentially rotatable. In the differential device 30, any one of the sun gear S2, the ring gear R2, and the carrier C2, which can be called power transmission elements to and from their connected objects, is connected to the engine ENG via the speed change device 20, one of the others is connected to the first rotary machine MG1, and the last one is connected to the second rotary machine MG2 and the driving wheel W. In this embodiment, the ring gear R1 of the speed change device 20 is connected to the carrier C2 via the rotating shaft 22 of the ring gear R1 and a rotating shaft 31 of the carrier C2. The MG1 rotating shaft 12 is connected to the sun gear S2 so as to be rotatable integrally therewith. The second rotary machine MG2 and the driving wheel W are connected to the ring gear R2.

A planetary gear unit 40 is provided between the ring gear R2 and the second rotary machine MG2 concentrically thereto. The planetary gear unit 40 exemplified herein is a single-pinion type planet gear mechanism, and includes a sun gear S3, a ring gear R3, a plurality of pinion gears P3, and a carrier C3, as differential rotation elements. The MG2 rotating shaft 13 is connected to the sun gear S3 so as to be rotatable integrally therewith. The ring gear R3 is fixed to a vehicle-body side (e.g., the case or the like of the power transmitting apparatus). A rotating shaft 32 of the ring gear R2 of the differential device 30 is connected to the carrier C3 via a rotating shaft 14 thereof. The carrier C3 and the ring gear R2 of the differential device 30 rotate integrally. The rotating shaft 14 is connected to a drive shaft 51 and the driving wheel W via a differential gear unit 50.

The hybrid system 1-1 is provided with an oil pump (not shown) configured to supply oil. The oil is used in cooling and lubrication of various components such as the speed change device 20 and the differential device 30 in the power transmitting apparatus. Further, the oil is used as hydraulic fluid for the clutch CL1 and the brake BK1.

In the power transmitting apparatus, an entire transmission speed ratio (so to speak, a system transmission speed ratio of the hybrid system 1-1) is determined from a transmission speed ratio of the speed change device 20 and a transmission speed ratio of the differential device 30. The system transmission speed ratio is a ratio in rotation number between the input and output sides in the power transmitting apparatus, and indicates a ratio (reduction speed ratio) of a input-side rotation number (a rotation number of the carrier C1 of the speed change device 20) relative to an output-side rotation number (a rotation number of the ring gear R2 of the differential device 30) in the power transmitting apparatus. Accordingly, in the power transmitting apparatus, a width of the transmission speed ratio is larger than a case where a function as the speed change gear is constituted only by the differential device 30.

Figure 3:
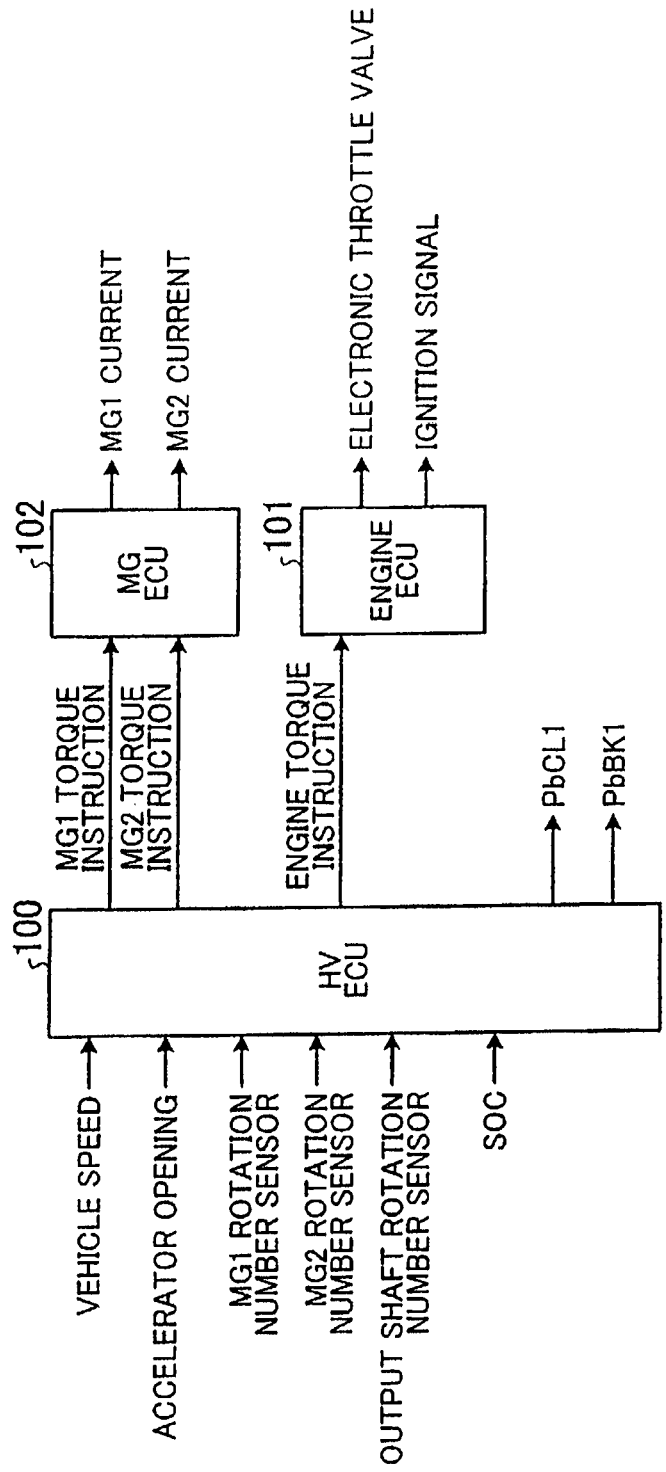
FIG. 3 is a view illustrating an input-output relationship of the hybrid system according to the present invention.

As illustrated in FIG. 3, the hybrid system 1-1 is provided with an integration ECU (hereinafter referred to as HVECU") 100 configured to generally control the engine ECU 101 and the MGECU 102 and to also perform an integration control on the system. A control device of this system is constituted by these ECUs.

Various sensors such as a vehicle speed sensor, an accelerator opening sensor, an MG1 rotation number sensor, an MG2 rotation number sensor, an output shaft rotation number sensor, and a battery sensor are connected to the HVECU 100. From the various sensors, the HVECU 100 acquires a vehicle speed, an accelerator opening, a rotation number (MG1 rotation number) of the first rotary machine MG1, a rotation number (MG2 rotation number) of the second rotary machine MG2, a rotation number of an output shaft of the power transmitting apparatus (e.g., the rotating shaft of the ring gear R2 of the differential device 30), an SOC (State of Charge) of a secondary battery, and the like.

Based on information thus acquired, the HVECU 100 calculates a requested vehicle driving force, a requested power, a requested torque, and the like of the hybrid vehicle.

Then, based on this, the HVECU 100 calculates a requested engine torque, a requested MG1 torque, and a requested MG2 torque, and transmits instructions of output control to the engine ECU 101 and the MGECU 102.

Further, the HVECU 100 outputs an instruction value (PbCL1) of a hydraulic pressure to be supplied to the clutch CL1 and an instruction value (PbBK1) of a hydraulic pressure to be supplied to the brake BK1 to a hydraulic pressure regulating apparatus (not shown). The hydraulic pressure regulating apparatus causes the clutch CL1 and the brake BK1 to perform an engagement operation or disengagement operation according to the instruction values.

In the hybrid system 1-1, an electric vehicle (EV) traveling mode and a hybrid (HV) traveling mode are set. The EV traveling mode is a traveling mode in which traveling is performed by a power of at least one of the first and second rotary machines MG1, MG2. The HV traveling mode is a traveling mode in which traveling is performed only by a power of the engine ENG or traveling is performed by use of a power of the second rotary machine MG2 in addition to the power of the engine ENG.

FIG. 4 illustrates an operation engagement table of the hybrid system 1-1 for each of the traveling modes. In a column of the clutch CL1 and a column of the brake BK1 in the operation engagement table, a circle mark indicates the completely engaged state, and a blank indicates the disengaged state. Further, a triangle mark indicates as follows: if the clutch CL1 is in the completely engaged state, the brake BK1 is in the disengaged state, and if the clutch CL1 is in the disengaged state, the brake BK1 is in the completely engaged state. In a column of the first rotary machine MG1 and a column of the second rotary machine MG2 in the operation engagement table, "G" indicates that the rotary machine operates mainly as a generator, and "M" indicates that the rotary machine operates mainly as an electric motor.

[EV Traveling Mode]

The EV traveling mode has two modes: a single motor EV mode in which only the second rotary machine MG2 is used as a power source; and a double motor EV mode in which both the first and second rotary machines MG1, MG2 are used as the power source. The single motor EV mode is selected at the time of a low load operation, and the double motor EV mode is selected at the time of a high load operation as compared to the low load operation.

[Single Motor EV Mode]

Figure 5:
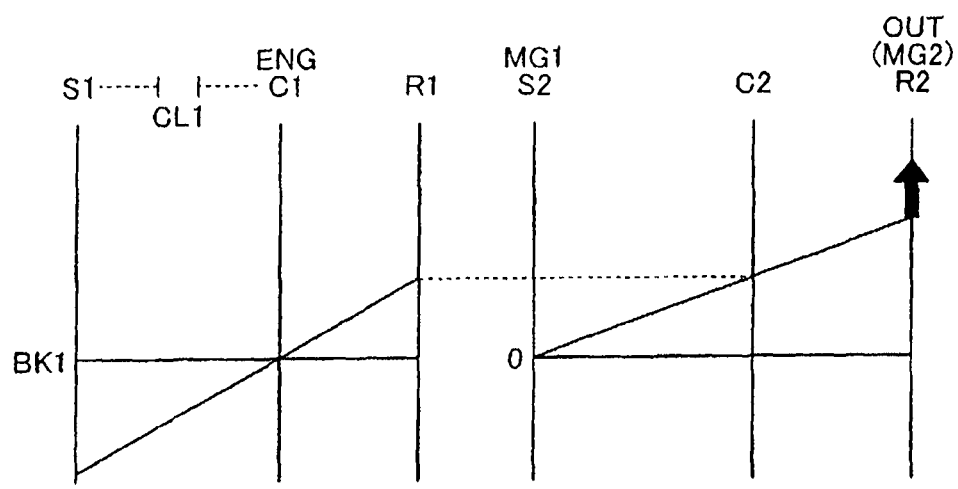
FIG. 5 is a collinear diagram according to a single motor EV mode.

In a case where a secondary battery is chargeable, electrical power consumption by engine braking is not necessarily required. Accordingly, in the single motor EV mode in this case, the clutch CL1 and the brake BK1 are both disengaged, so that the speed change device 20 is in the neutral state. In a case of forward movement, the HVECU 100 causes the second rotary machine MG2 to output a positive MG2 torque by a positive rotation according to a requested vehicle driving force. The positive rotation indicates a rotation direction of the MG2 rotating shaft 13 and the ring gear R2 of the differential device 30 at the time of forward movement. FIG. 5 is a collinear diagram at the time of this forward movement. In the meantime, in a case of rearward movement, the HVECU 100 causes the second rotary machine MG2 to output a negative MG2 torque by a negative rotation according to a requested vehicle driving force.

In the EV traveling, the ring gear R1 of the speed change device 20 is associatively rotated. However, since the speed change device 20 is in the neutral state, the engine ENG has zero rotation (the engine does not rotate) and is not associatively rotated. Accordingly, in the EV traveling, it is possible to take a large regeneration amount of the first rotary machine MG1. Further, it is possible to perform traveling in a state where the engine ENG is stopped, and no drag loss of the engine ENG occurs, thereby making it possible to improve fuel efficiency (power efficiency).

Here, in the single motor EV mode, it is desirable to reduce a drag loss of the first rotary machine MG1 along with a differential rotation of the differential device 30. More specifically, the HVECU 100 causes the first rotary machine MG1 to generate an electric power by applying a little torque thereto, and performs a feedback control to adjust the MG1 rotation number to zero. Hereby, it is possible to reduce the drag loss of the first rotary machine MG1. Further, if it is possible to maintain the first rotary machine MG1 to have zero rotation without applying a torque to the first rotary machine MG1, the drag loss of the first rotary machine MG1 may be reduced without applying a torque to the first rotary machine MG1. Further, in order to reduce the drag loss of the first rotary machine MG1, the first rotary machine MG1 may be set to have zero rotation by use of a cogging torque or d-axis lock of the first rotary machine MG1. The d-axis lock indicates that a current to generate a magnetic field that fixes a rotator is supplied from an inverter to the first rotary machine MG1, and refers to a control to cause the first rotary machine MG1 to have zero rotation.

Further, in a case where the charge of the secondary battery is prohibited, traveling may be performed in the single motor EV mode using the engine braking together in order to cause the secondary battery to discharge. In this case, as illustrated in FIG. 4, either one of the clutch CL1 and the brake BK1 is engaged, so as to cause the engine ENG to be associatively rotated and to generate engine braking. At this time, the HVECU 100 increases an engine speed by control of the first rotary machine MG1.

[Double Motor EV Mode]

Figure 6:
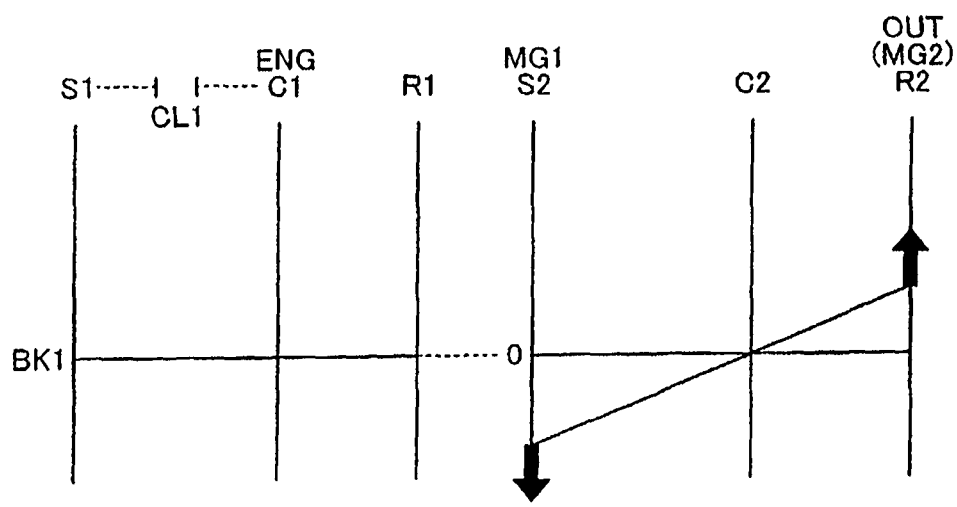
FIG. 6 is a collinear diagram according to a double motor EV mode.

In the double motor EV mode, the HVECU 100 causes both the clutch CL1 and the brake BK1 to be completely engaged, and stops all the speed-changing rotating elements of the speed change device 20. Hereby, in the hybrid system 1-1, the rotation number of the engine ENG becomes zero, and the carrier C2 of the differential device 30 is locked to zero rotation. FIG. 6 is a collinear diagram at this time.

The HVECU 100 causes an MG1 torque and an MG2 torque to be output according to a requested vehicle driving force. At this time, since the carrier C2 is prohibited from rotating, the carrier C2 is able to receive a reaction force to the MG1 torque. Accordingly, at the time of forward movement, the first rotary machine MG1 is caused to output a negative MG1 torque by a negative rotation, so that a positive rotation torque can be output from the ring gear R2. In the meantime, at the time of rearward movement, the first rotary machine MG1 is caused to output a positive MG1 torque by a positive rotation, so that a negative rotation torque can be output from the ring gear R2.

[HV Traveling Mode]

Figure 7:
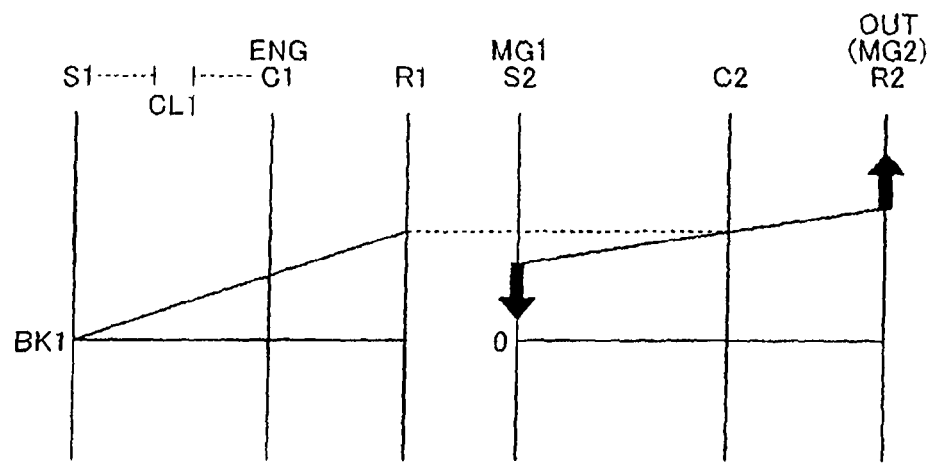
FIG. 7 is a collinear diagram according to an HV high mode.
Figure 8:
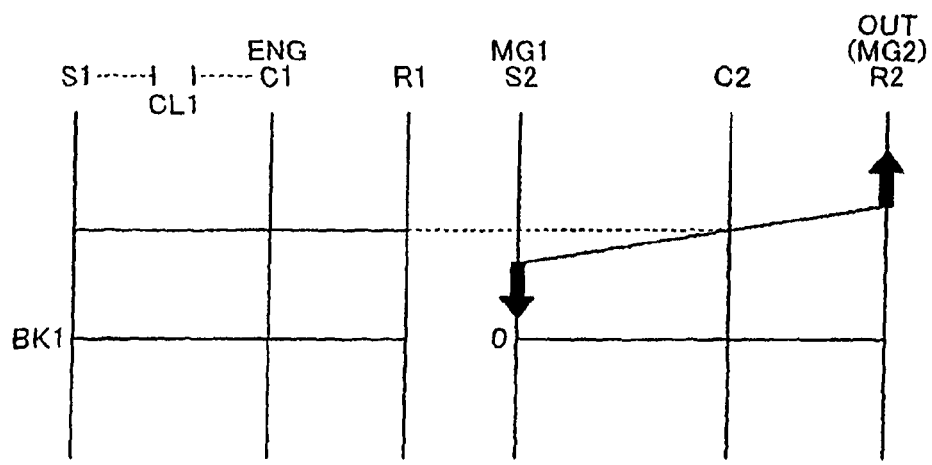
FIG. 8 is a collinear diagram according to an HV low mode.

In the HV traveling mode, while the first rotary machine MG1 receives a reaction force, traveling is performed only by an engine torque or by an engine torque and an MG2 torque. The engine torque transmitted to the drive shaft 51 at this time is a so-called engine direct transmission torque, and is transmitted mechanically from the engine ENG without passing through any electric path. The HV traveling mode has two modes: a traveling mode (hereinafter referred to as "HV high mode") in which the speed change device 20 is at a high-speed gear position; and a traveling mode (hereinafter referred to as "HV low mode") in which the speed change device 20 is at a low-speed gear position. FIG. 7 is a collinear diagram in the HV high mode. Further, FIG. 8 is a collinear diagram in the HV low mode. In the HV traveling mode, the differential device 30 is basically in a state where a differential rotation is performable, and the states (the engaged state or the disengaged state) of the clutch CL1 and the brake BK1 are controlled so as to change the gear position of the speed change device 20.

The HVECU 100 performs a control in the HV high mode by disengagement of the clutch CL1 and complete engagement of the brake BK1. In the meantime, the HVECU 100 performs a control in the HV low mode by complete engagement of the clutch CL1 and disengagement of the brake BK1.

In the rearward movement, the HV low mode is used. In the rearward movement, the first rotary machine MG1 is operated as a generator and the second rotary machine MG2 is operated as an electric motor, and the second rotary machine MG2 is rotated in a direction reverse to a direction in the forward movement.

When the HVECU 100 switches between the HV high mode and HV low mode, the HVECU 100 performs a coordinated transmission control to cause the speed change device 20 and the differential device 30 to change gears at the same time. In the coordinated transmission control, a transmission speed ratio of either one of the speed change device 20 and the differential device 30 is increased, and a transmission speed ratio of the other one is decreased. In the hybrid system 1-1, a transmission system in an entire system is constituted by the speed change device 20, the differential device 30, the first rotary machine MG1, the clutch CL1, and the brake BK1. In view of this, by electrically controlling a rotation of the first rotary machine MG1, it is possible to cause these component parts to operate as an electrical continuously variable transmission in which a system transmission speed ratio is continuously changed. At the time of regeneration, the second rotary machine MG2 is used mainly.

More specifically, when the HV high mode is switched to the HV low mode, the HVECU 100 changes the transmission speed ratio of the differential device 30 to a high gear side in synchronization with gear change of the speed change device 20 into the low-speed gear position, so that the system transmission speed ratio in a course of the switching is maintained constant. In the meantime, when the HV low mode is switched to the HV high mode, the HVECU 100 changes the transmission speed ratio of the differential device 30 to a low gear side in synchronization with gear change of the speed change device 20 into the high-speed gear position, so that the system transmission speed ratio in a course of the switching is maintained constant. As such, in the hybrid system 1-1, since a discontinuous change of the system transmission speed ratio is restrained or reduced, a control amount of the engine speed along with the gear change is reduced, or adjustment of the engine speed along with the gear change becomes unnecessary.

After the switching to the HV low mode, the HVECU 100 continuously changes the system transmission speed ratio to a low gear side by controlling the transmission speed ratio of the differential device 30, for example. In the meantime, after the switching to the HV high mode, the HVECU 100 continuously changes the system transmission speed ratio to a high gear side by controlling the transmission speed ratio of the differential device 30, for example. The control of the transmission speed ratio of the differential device 30 is performed, for example, by controlling the rotation numbers of the first rotary machine MG1 and the second rotary machine MG2. In the hybrid system 1-1, the transmission system in the entire system is constituted by the speed change device 20, the differential device 30, the first rotary machine MG1, the clutch CL1, and the brake BK1. In view of this, by electrically controlling a rotation of the first rotary machine MG1, it is possible to cause these component parts to operate as an electrical continuously variable transmission in which the system transmission speed ratio is continuously changed.

Figure 9:
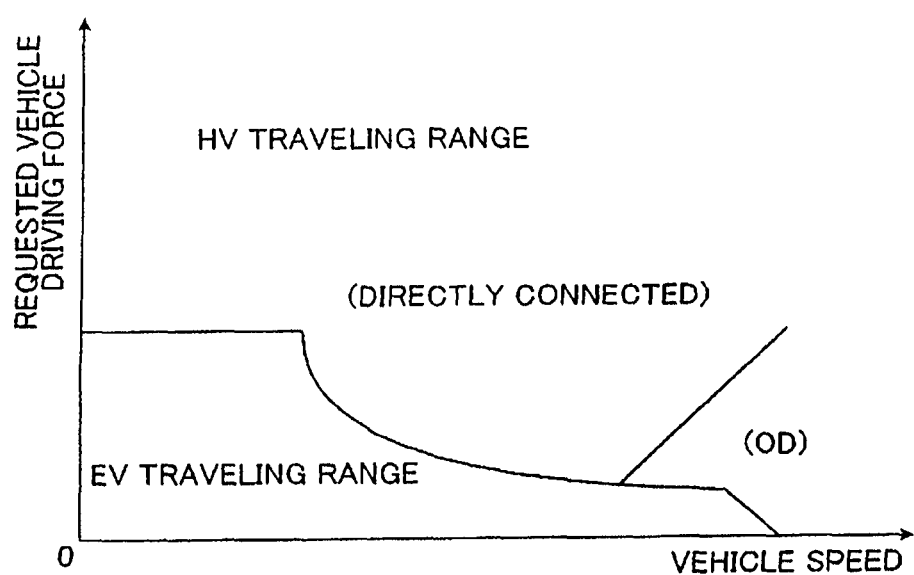
FIG. 9 is a view to describe an EV traveling range and an HV traveling range.

Here, FIG. 9 illustrates an exemplary corresponding relationship between a vehicle speed, a requested vehicle driving force, and a traveling mode. In the hybrid system 1-1, when the requested vehicle driving force is low, the EV traveling is performed. However, as the vehicle speed becomes higher and higher than a given speed, an EV traveling range is narrowed according to output characteristics of the first rotary machine MG1 and the second rotary machine MG2. When the vehicle speed is high and the requested vehicle driving force is low, the HV traveling in which the speed change device 20 is controlled to an overdrive state (the high-speed gear position) is performed, so as to improve fuel efficiency. In the other ranges (that is, at the time when the requested vehicle driving force is middle and high regardless of the vehicle speed, and at the time when the vehicle speed is middle and the requested vehicle driving force is low), the speed change device 20 is controlled to the directly-connected state (the low-speed gear position), so as to perform the HV traveling. Further, even in a case where the vehicle speed is high and the requested vehicle driving force is low, as the vehicle speed decreases, the speed change device 20 is controlled to the directly-connected state. Note that, in a case where the SOC of the secondary battery is large to the extent that discharging is performable, the EV traveling is performed in preference to the HV traveling.

As such, in a case where the HV traveling is performed, at the time of high vehicle speed traveling, the HV high mode in which power circulation is reducible is selected, and at the time of traveling at a middle/low vehicle speed lower than the above, the HV low mode is selected. In the hybrid system 1-1, since the system transmission speed ratio has two mechanical points (system transmission speed ratio γ1≠ system transmission speed ratio γ2) on a higher gear side than 1, it is possible to improve transmission efficiency at the time when the hybrid system 1-1 operates in a high gear in the HV traveling mode, thereby making it possible to improve fuel efficiency at the time of high vehicle speed traveling.

When the EV traveling mode is switched to the NV traveling mode, the HVECU 100 starts the engine ENG that is stopped. In a case where the current EV traveling is the single motor EV mode (the engine braking is unnecessary), the HVECU 100 causes the speed change device 20 that is in the neutral state to change gears into a target gear position according to the HV traveling mode thus switched (the HV high mode or the HV low mode). Further, in a case where the current EV traveling is the single motor EV mode with the engine braking, when a current gear position (a high-speed gear position or a low-speed gear position) in the speed change device 20 is different from a target gear position according to the HV traveling mode thus switched, the HVECU 100 causes the speed change device 20 change gears into the target gear position. Further, in a case where the current EV traveling is the double motor EV mode, the HVECU 100 causes the speed change device 20 in the directly-connected state to change gears into a target gear position according to the HV traveling mode thus switched. At the time of starting of the engine ENG, the rotation number of the engine ENG is increased by the first rotary machine MG1, and then ignited. At this time, the second rotary machine MG2 is caused to output a MG2 torque to which a cancellation torque to a reaction force that the first rotary machine MG1 receives is added.

In the meantime, the hybrid system 1-1 is roughly divided into the engine ENG and the component parts other than the engine ENG. The component parts other than the engine ENG are housed in a casing 60 (FIG. 2). Sequentially from the vehicle front side, the casing 60 includes a housing 61 fastened, with bolts, to a rear end of the engine ENG, and a main case 62 fastened to the housing 61 with bolts. In the hybrid system 1-1, the entire engine ENG or almost the entire engine ENG except the rear end is placed in an engine room, and the casing 60 (that is, the component parts other than the engine ENG) is placed below the floor tunnel provided on a vehicle rear side relative to the engine room.

The following specifically describes an arrangement inside the casing 60 in the hybrid system 1-1, that is, an arrangement of the component parts other than the engine ENG, with reference to FIG. 2. In the following description, unless otherwise specified, a direction along a shaft center of the hybrid system 1-1 (rotation centers of the engine rotating shaft 11, the MG1 rotating shaft 12, and the like) is referred to as an axis direction, and a direction around the shaft center is referred to as a circumferential direction. Further, a direction perpendicular to the shaft center is referred to as a radial direction. In the radial direction, a side toward an inner side is referred to as a radial inside, and a side toward an outer side is referred to as a radial outside.

Among the component parts other than the engine ENG, the first rotary machine MG1 is a component part having a largest outside diameter. In view of this, it is desirable that the first rotary machine MG1 be placed on a vehicle front side (an engine ENG side) having a large diameter in the floor tunnel. That is, it is desirable that the first rotary machine MG1 be placed inside the casing 60 so as to be closer to the engine ENG. In view of this, the first rotary machine MG1 is placed on the vehicle front side in the casing 60 as illustrated in FIG. 2. As described above, the speed change device 20 and the differential device 30 are placed at a position farther from the engine ENG than the first rotary machine MG1, that is, on the vehicle rear side relative to the first rotary machine MG1. Accordingly, in the hybrid system 1-1, the clutch CL1 and the brake BK1 configured to operate the speed change device 20 are also placed on the vehicle rear side relative to the first rotary machine MG1.

More specifically, the engine ENG, the first rotary machine MG1, the clutch CL1 and the brake BK1, the speed change device 20, the differential device 30, and the second rotary machine MG2 are placed in this order from the vehicle front side in a concentric manner. The first rotary machine MG1, the clutch CL1, the brake BK1, the speed change device 20, and the differential device 30 are housed in the housing 61. Further, the second rotary machine MG2 and the planetary gear unit 40 are housed in the main case 62.

An opening of the housing 61 on the engine ENG side (an opening provided on the engine ENG side in the casing 60) is covered with a disciform cover wall 71 concentric to the engine ENG, the first rotary machine MG1, and so on. In the meantime, inside the housing 61, a disciform partition wall 72 is concentrically provided between the first rotary machine MG1, and the clutch CL1 and the brake BK1. On this account, the inside of the housing 61 is divided into a housing space in which to place the first rotary machine MG1 and which is surrounded by the cover wall 71 and the partition wall 72, and a housing space in which to place the clutch CL1, the brake BK1, the speed change device 20, and the differential device 30 provided on the vehicle rear side relative to the partition wall 72.

In the first rotary machine MG1, inner rings of two annular bearings BR1, BR2 are fitted to an outer peripheral surface of a rotor that can be called the MG1 rotating shaft 12. Meanwhile, an outer ring of the bearing BR1 is fitted to a radially inside part of the cover wall 71. Further, an outer ring of the bearing BR2 is fitted to a radially inside part of the partition wall 72. Here, a radially outside part of each of the cover wall 71 and the partition wall 72 is fixed to the housing 61 with bolts, so that the cover wall 71 and the partition wall 72 do not rotate in the circumferential direction. This allows the rotor of the first rotary machine MG1 to rotate in the circumferential direction inside the housing 61. Note that the rotation is detected by a resolver R serving as the MG1 rotation number sensor.

That rotating shaft 21 of the carrier C1 which can be called an input shaft of the speed change device 20 is placed on a radial inside of the sun gear S1, and is fixed to the carrier C1 on the vehicle rear side (a driving-wheel-W side) in the speed change device 20. In the speed change device 20, annular bearings BR3, BR4 are provided between an outer peripheral surface of the rotating shaft 21 and an inner peripheral surface of the sun gear S1, so that a relative rotation therebetween in the circumferential direction is allowed. The rotating shaft 21 is extended in the axis direction toward the engine ENG side, and penetrates through the cover wall 71 so as to be connected to an engine-rotating-shaft-11 side via a damper limiter (not shown). Accordingly, the rotating shaft 21 also exists on a radial inside of the first rotary machine MG1.

In the meantime, that rotating shaft 22 of the ring gear R1 which can be called an output shaft of the speed change device 20 is a disciform member provided on the vehicle rear side relative to a fixed part between the carrier C1 and the rotating shaft 21. The rotating shaft 22 has a hole formed in its shaft center part, and an outer peripheral surface of the rotating shaft 31 of the carrier C2 in the differential device 30 is splined to an inner peripheral surface formed in the hole. It may be said that the rotating shaft 31 of the carrier C2 is an input shaft of the differential device 30. In the differential device 30, the rotating shaft 32 of the ring gear R2 serves as a member corresponding to an output shaft.

Further, as described above, the sun gear S2 of the differential device 30 is connected to the MG1 rotating shaft 12 (the rotor), and rotates integrally with the MG1 rotating shaft 12. The sun gear S2 is connected to the MG1 rotating shaft 12 (the rotor) via first and second connecting members 73, 74. The first and second connecting members 73, 74 are placed on the vehicle rear side relative to the partition wall 72.

The first connecting member 73 is a tubular member concentric to the differential device 30 and so on and is configured such that its vehicle rear side is closed by the differential device 30 and its vehicle front side is opened. The clutch CL1, the brake BK1, and the speed change device 20 are placed inside the first connecting member 73. That is, the first connecting member 73 is placed radially outside the clutch CL1, the brake BK1, and the speed change device 20. The first connecting member 73 is placed on the vehicle front side relative to the differential device 30, and a radially inside part thereof on the vehicle rear side is fixed to the sun gear S2 by welding or the like. Accordingly, the rotating shaft 31 of the carrier C2 is extended to the inside of the first connecting member 73.

The second connecting member 74 is a disciform member configured to close an opening of the first connecting member 73 on the vehicle front side. The second connecting member 74 is inserted into the first connecting member 73, and a snap ring 75 is placed in a radially outside part thereof, so that the second connecting member 74 is fixed to the first connecting member 73. In the meantime, a radially inside part of the second connecting member 74 is splined to the outer peripheral surface of the MG1 rotating shaft 12 (the rotor).

Figure 10:
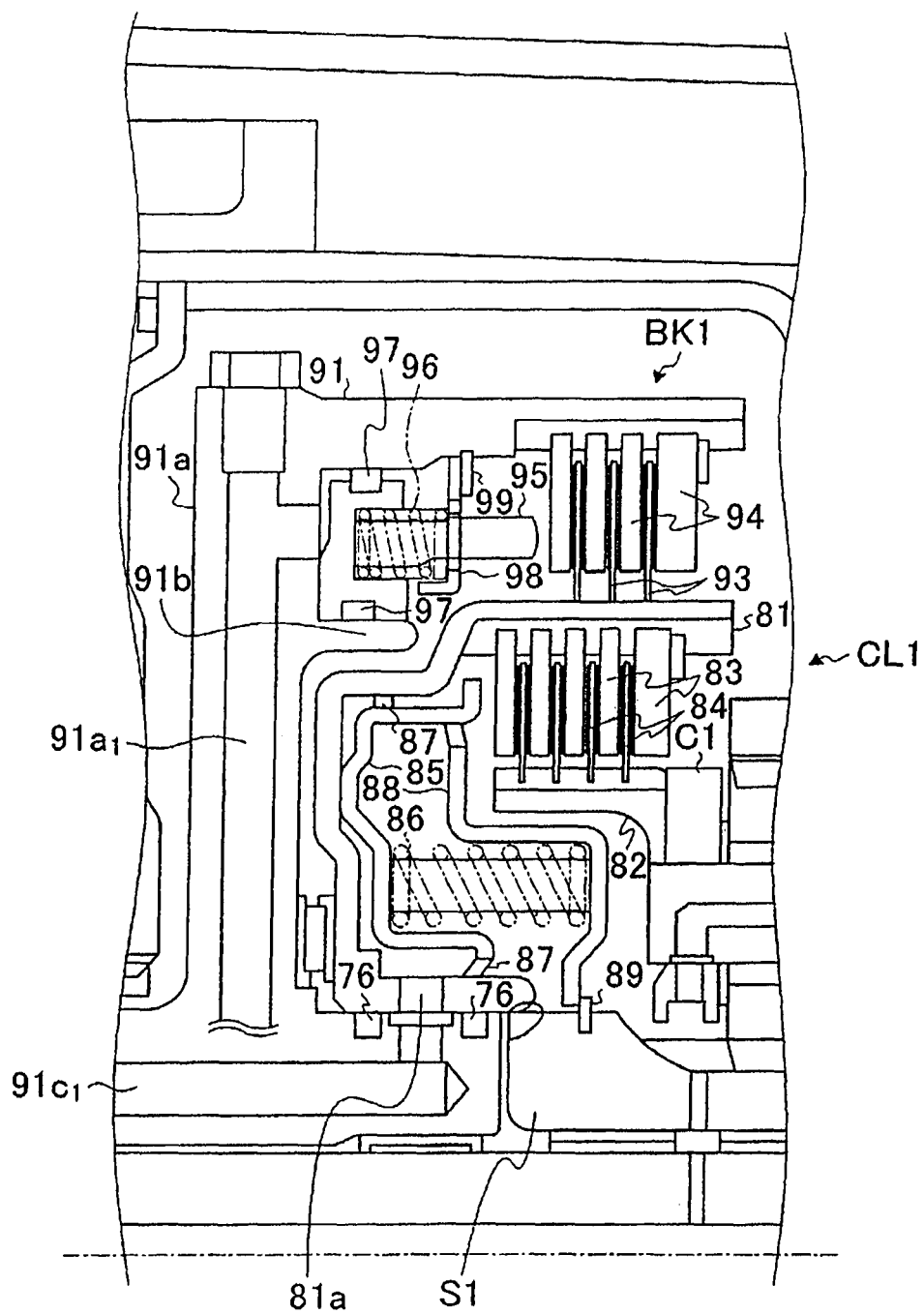
FIG. 10 is an enlarged view of a clutch and a brake in FIG. 2.

The clutch CL1 is a multi-disc clutch device, and includes a cylinder member 81, a hub member 82, a plurality of first plates 83, a plurality of second plates (friction plates) 84, a piston member 85, and elastic members 86 (FIG. 10).

The cylinder member 81 is a member having an annular space concentric to the speed change device 20 and so on, and is placed on the vehicle front side relative to the speed change device 20. A vehicle front side of the annular space is closed by a wall surface, and a vehicle rear side thereof is opened. A radially inside part of the cylinder member 81 is fixed to the sun gear S1 of the speed change device 20 by welding or the like. Further, a radially inside part of the after-mentioned cylinder member 91 of the brake BK1 is inserted into the radially inside part of the cylinder member 81. That is, the cylinder member 81 is supported by the sun gear S1 and the cylinder member 91 of the brake BK1. Further, the plurality of annular first plates 83 is placed at intervals in the axis direction on an inner peripheral surface of a radially outside part of the cylinder member 81 forming the annular space. The first plates 83 may be considered as the first engaging member described above.

The hub member 82 is an annular member concentric to the speed change device 20 and so on. The hub member 82 is placed inside the cylinder member 81, and its outer peripheral surface is opposed to the inner peripheral surface of the radially outside part of the cylinder member 81. The plurality of annular second plates 84 is placed at intervals in the axis direction on an outer peripheral surface of the hub member 82. The second plates 84 may be considered as the second engaging member described above, and an annular surface of each of the second plates 84 in the axis direction is provided with a friction material. The second plate 84 is placed between the first plates 83 adjacent to each other. The hub member 82 is fixed to the carrier C1 of the speed change device 20.

The piston member 85 is a member placed inside the cylinder member 81 in a state where the piston member 85 is movable in a reciprocating manner in the axis direction relative to the cylinder member 81. The piston member 85 is a member molded into a shape similar to the cylinder member 81, and has an annular space, and a wall surface covering a vehicle front side of the annular space. Respective annular sealing members (O-ring or the like) 87 are placed between radially outside parts of the piston member 85 and the cylinder member 81 and between radially inside parts of the piston member 85 and the cylinder member 81. Hereby, a highly fluid-tight annular space (an oil chamber) is formed therebetween.

A hydraulic fluid for the clutch CL1 is supplied to the oil chamber. When the hydraulic fluid is supplied to the oil chamber and a hydraulic pressure therein increases, the piston member 85 moves toward the vehicle rear side so as to add a pressing force to the first plates 83 by the radially outside part thereof. Accordingly, in this case, the clutch CL1 is in the engaged state. In the meantime, when the hydraulic pressure of the oil chamber is decreased, the clutch CL1 is in the disengaged state. In order to create the disengaged state, in the annular space inside the piston member 85, a plurality of elastic members 86 is placed at intervals in the circumferential direction. The elastic members 86 generate an elastic force in the disengaged state in advance, and are compressed along with the movement of the piston member 85 in an engaging direction. When the hydraulic pressure of the oil chamber is decreased, the elastic members 86 push the piston member 85 back to the vehicle front side by the elastic force generated along with the compression. In view of this, in the clutch CL1, one ends of the elastic members 86 are held by the piston member 85, and the other ends thereof are held by a hold member 88. The hold member 88 is placed so as to cover an annular opening of the piston member 85. A movement of the hold member 88 in the axis direction is regulated due to the elastic members 86 and a snap ring 89 provided on the sun gear S1.

Here, as described above, the cylinder member 81 is supported by the sun gear S1 and the cylinder member 91 of the brake BK1. Component parts of the clutch CL1, such as the hub member 82 and the plurality of first and second plates 83, 84, are placed inside the cylinder member 81. In view of this, it can be said that the clutch CL1 is supported by the sun gear S1 and the cylinder member 91 of the brake BK1.

The brake BK1 is a multi-disc braking device. In this embodiment, the cylinder member 81 of the clutch CL1 is also used as a hub member of the brake BK1. The brake BK1 includes a cylinder member 91, a hub member doubling as the cylinder member 81 of the clutch CL1, a plurality of first plates 93, a plurality of second plates (friction plates) 94, a piston member 95, and elastic members 96 (FIG. 10).

The cylinder member 91 is a member having an annular space concentric to the speed change device 20 and so on, and is placed on the vehicle front side relative to the speed change device 20. A vehicle front side of the annular space is closed by a disciform wall portion 91a, and a vehicle rear side thereof is opened. The clutch CL1 is placed in this space. The plurality of annular first plates 93 is placed at intervals in the axis direction on an outer peripheral surface of the cylinder member 81 of the clutch CL1. The first plates 93 may be considered as the third engaging member described above, and an annular surface of each of the first plates 93 in the axis direction is provided with a friction material. The outer peripheral surface of the cylinder member 81 is opposed to on an inner peripheral surface of a radially outside part of the cylinder member 91 forming the annular space. The plurality of annular second plates 94 is disposed at intervals in the axis direction on the inner peripheral surface of the radially outside part of the cylinder member 91. The second plates 94 may be considered as the fourth engaging member described above. The first plate 93 is placed between the second plates 94 adjacent to each other. As such, the brake BK1 is placed radially outside the clutch CL1.

The piston member 95 is an annular member provided inside the cylinder member 91 so as to be placed on the radially outside part thereof in a state where the piston member 95 is movable in a reciprocating manner in the axis direction relative to the cylinder member 91. An annular sealing member (O-ring or the like) 97 is placed between the piston member 95 and the radially outside part of the cylinder member 91. The cylinder member 91 includes a hold portion 91b provided inside the cylinder member 91 and configured to support the piston member 95 from a radial inside. The hold portion 91b is an annular member extended toward the vehicle rear side from the wall portion 91a (that part of the wall portion 91a which is placed radially inside the radially outside part thereof). In the brake BK1, an annular sealing member (O-ring or the like) 97 is also placed between the hold portion 91b and the piston member 95. Hereby, a highly fluid-tight annular space (an oil chamber) is formed between the piston member 95 and the cylinder member 91.

A hydraulic fluid for the brake BK1 is supplied to the oil chamber. When the hydraulic fluid is supplied to the oil chamber and an oil pressure therein increases, the piston member 95 moves toward the vehicle rear side so as to add a pressing force to the second plates 94. Accordingly, in this case, the brake BK1 is in the engaged state. In the meantime, when the hydraulic pressure of the oil chamber is decreased, the brake BK1 is in the disengaged state. In order to create the disengaged state, a plurality of elastic members 96 is placed between the piston member 95 and a hold member 98 at intervals in the circumferential direction. One ends of the elastic members 96 are held by the piston member 95, and the other ends thereof are held by the hold member 98. The hold member 98 is an annular member placed between the piston member 95 and the second plates 94. The elastic members 96 generate an elastic force in the disengaged state in advance, and is compressed along with the movement of the piston member 95 in an engaging direction. When the hydraulic pressure of the oil chamber is decreased, the elastic members 96 push the piston member 95 back to the vehicle front side by the elastic force generated along with the compression. A movement of the hold member 98 in the axis direction is regulated due to the elastic members 96 and a snap ring 99 provided on the radially outside part of the cylinder member 91.

As such, in the hybrid system 1-1, the clutch CL1 is supported by the cylinder member 91, and the cylinder member 91 is connected to the cover wall 71 provided on the engine ENG side relative to the first rotary machine MG1. Accordingly, even if the first rotary machine MG1 is placed closer to the engine ENG side, it is possible to place the clutch CL1 and the brake BK1 at a position farther from the engine ENG than the first rotary machine MG1. As a result, in the hybrid system 1-1, it is possible to improve mountability of the clutch CL1 and the brake BK1 at the time when the first rotary machine MG1 is placed on the engine ENG side.

Further, component parts of the brake BK1, such as the hub member (the cylinder member 81 of the clutch CL1) and the plurality of first and second plates 93, 94, are placed inside the cylinder member 91. The clutch CL1 is also placed inside the cylinder member 91. That is, the clutch CL1 and the brake BK1 are placed side by side in the radial direction in a space at a generally equal position in the axis direction on the vehicle rear side relative to the first rotary machine MG1 and on the vehicle front side relative to the speed change device 20 and the differential device 30. At this time, a largest outside diameter including the clutch CL1 and the brake BK1 is smaller than a largest outside diameter of the first rotary machine MG1. Accordingly, in the hybrid system 1-1, it is possible to restrain an increase of a body size in the axis direction, and it is possible to place the first rotary machine MG1 on the vehicle front side (the engine ENG side) and to place the clutch CL1 and the brake BK1 on the vehicle rear side relative to the first rotary machine MG1. This makes it possible to improve mountability thereof.

The following describes oil passages of the hydraulic fluids for the clutch CL1 and the brake BK1.

The hydraulic fluids are force-fed by the oil pump, and sent to the vehicle front side via oil passages $61a$, $61b$ formed inside a wall surface of the housing 61 (FIG. 2). The oil passage $61a$ is an oil passage for the clutch CL1. Meanwhile, the oil passage $61b$ is an oil passage for the brake BK1. The oil passages $61a$, $61b$ are formed at different phases in the circumferential direction so as not to be intersected with each other.

The oil passage $61a$ for the clutch CL1 communicates with that oil passage $71a$ for the clutch CL1 which is formed inside a wall surface of the cover wall 71. Further, the oil passage $61b$ for the brake BK1 communicates with that oil passage $71b$ for the brake BK1 which is formed inside the wall surface of the cover wall 71. The oil passages $71a$, $71b$ of the cover wall 71 have oil passages extending in the radial direction and are formed at different phases in the circumferential direction so as not to be intersected with each other. Further, in this embodiment, the oil passages $71a$, $71b$ are placed so as to further deviate from each other in the axis direction. Respective radially outside parts of the oil passages $71a$, $71b$ communicate with the oil passages $61a$, $61b$ of the housing 61.

The hydraulic fluids are supplied to the clutch CL1 and the brake BK1 respectively from the oil passages $71a$, $71b$ in the cover wall 71. However, the first rotary machine MG1 is provided between the clutch CL1 and the oil passage $71a$ and between the brake BK1 and the oil passage $71b$. In the hybrid system 1-1, oil passages configured to connect them are provided. In order to provide the oil passages, the cylinder member 91 is provided with a cylindrical tubular portion $91c$ extended in the axis direction toward the vehicle front side from a radially inside part of the wall portion $91a$.

The tubular portion $91c$ is extended to a radial inside of the cover wall 71. The tubular portion $91c$ is connected to the cover wall 71 by a spline joint SB. Hereby, the cylinder member 91 is prohibited from rotating relative to the casing 60 in the circumferential direction. Note that the spline joint SB is formed so that the cover wall 71 is easily assembled to the tubular portion $91c$. The tubular portion $91c$ is concentric to the rotating shaft 21 of the carrier C1. When the rotating shaft 21 inserted into the tubular portion $91c$, the tubular portion $91c$ covers the rotating shaft 21 from its radial outside. Annular bearings BR5, BR6 are placed between the tubular portion $91c$ and the rotating shaft 21, so that the tubular portion $91c$ and the rotating shaft 21 are supported by each other via the bearings BR5, BR6. This allows the rotating shaft 21 to rotate relative to the tubular portion $91c$ (the cylinder member 91) in the circumferential direction. Further, the tubular portion $91c$ is inserted into the MG1 rotating shaft (the rotor) 12, and is covered with the MG1 rotating shaft (the rotor) 12 from its radial outside. Annular bearings BR7, BR8 are placed between the tubular portion $91c$ and the MG1 rotating shaft (the rotor) 12, so that the tubular portion $91c$ and the MG1 rotating shaft (the rotor) 12 are supported by each other via the bearings BR7, BR8. This allows the MG1 rotating shaft (the rotor) 12 to rotate relative to the tubular portion $91c$ (the cylinder member 91) in the circumferential direction.

The tubular portion $91c$ is configured such that an oil passage $91c_1$ for the clutch CL1 and an oil passage $91c_2$ for the brake BK1 are formed inside a wall surface thereof. The oil passage $91c_1$ for the clutch CL1 communicates with the oil passage $71a$ for the clutch CL1 in the cover wall 71. Further, the oil passage $91c_2$ for the brake BK1 communicates with the oil passage $71b$ for the brake BK1 in the cover wall 71. The oil passages $91c_1$, $91c_2$ have oil passages extending in the axial direction and are formed at different phases in the circumferential direction so as not to be intersected with each other.

The oil passage $91c_1$ for the clutch CL1 communicates with an oil passage $81a$ formed in the radially inside part of the cylinder member 81. The oil passage $81a$ is a through hole configured to communicate an outer peripheral surface side (a cylinder-member-91 side) with an inner peripheral surface side (an oil-chamber side of the clutch CL1) in the radially inside part of the cylinder member 81. Accordingly, the hydraulic fluid is able to come and go between the oil passage $91c_1$ and the oil chamber of the clutch CL1. This allows the clutch CL1 to perform the engagement operation and the disengagement operation. Note that, in this embodiment, two annular sealing members (O-ring or the like) 76 are placed between the inner peripheral surface of the radially inside part of the cylinder member 81 and the outer peripheral surface of the radially inside part of the cylinder member 91 (FIG. 10), thereby restraining leakage of the hydraulic fluid from a connection portion between the oil passage $81a$ and the oil passage $91c_1$.

In the meantime, the oil passage $91c_2$ for the brake BK1 communicates with an oil passage $91a_1$ formed in the wall portion $91a$. The oil passage $91a_1$ has an oil passage extended in the radial direction inside a wall surface of the wall portion $91a$. The oil passage $91a_1$ communicates with the oil chamber of the brake BK1. Accordingly, the hydraulic fluid is able to come and go between the oil passage $91a_1$ and the oil chamber of the brake BK1. This allows the brake BK1 to perform the engagement operation and the disengagement operation.

As described above, in the hybrid system 1-1 of the present embodiment, the first rotary machine MG1 having a large outside diameter is placeable on the vehicle front side, and the clutch CL1 and the brake BK1 of the power transmitting apparatus are placeable in the space on the vehicle rear side relative to the first rotary machine MG1. Further, in the hybrid system 1-1, even if the first rotary machine MG1 having such a large outside diameter is placed on the vehicle front side, it is possible to secure oil passages of the hydraulic fluids for the clutch CL1 and the brake BK1 placed on the vehicle rear side relative to the first rotary machine MG1. Accordingly, in the hybrid system 1-1, the mountability of the first rotary machine MG1, the clutch CL1, and the brake BK1 inside casing 60 improves, thereby accordingly making it possible to improve mountability thereof to a vehicle.

Modified Embodiment 1

Figure 11:
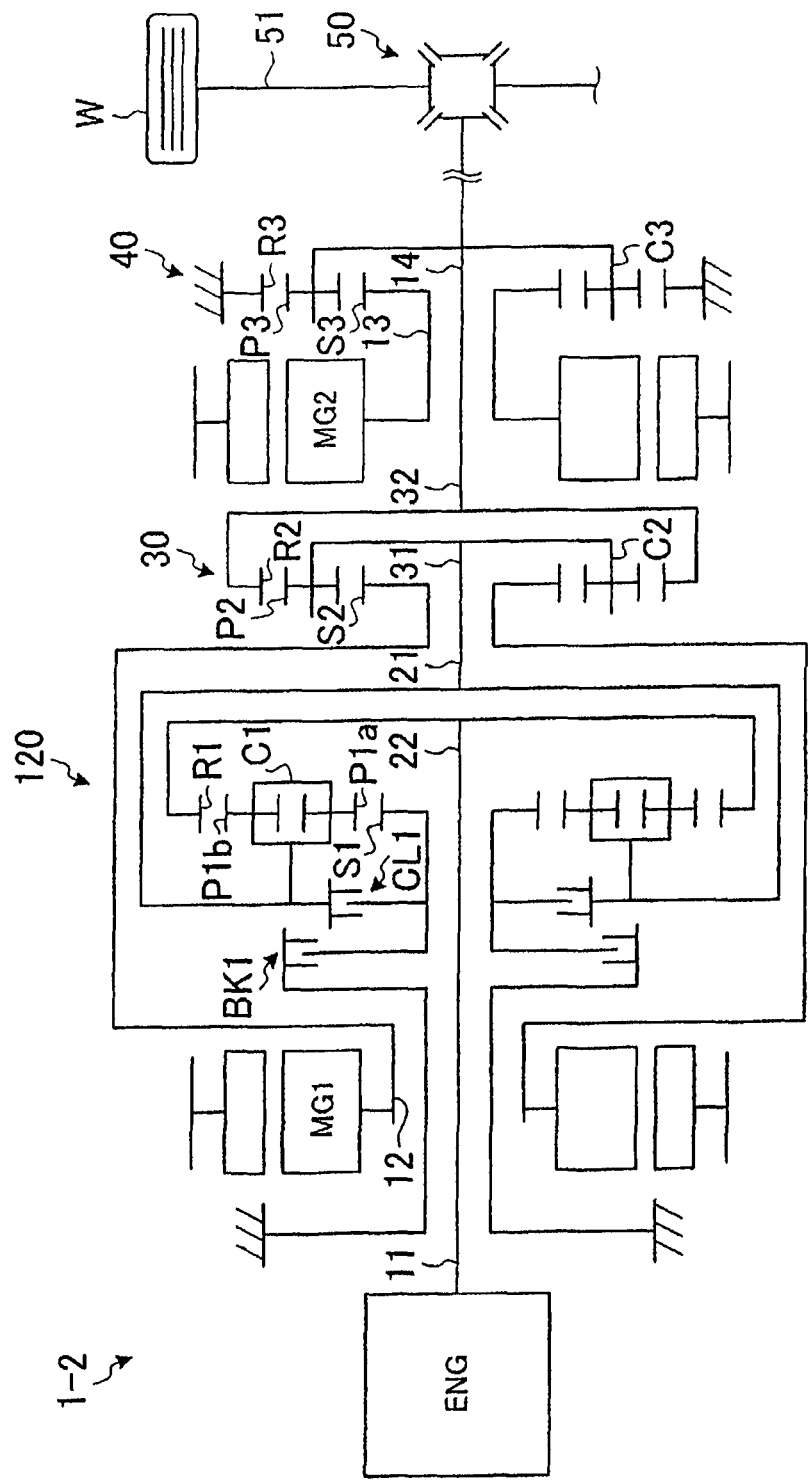
FIG. 11 is a skeleton diagram illustrating a configuration of Modified Embodiment 1 of the hybrid system according to the present invention.

A reference sign 1-2 in FIG. 11 indicates a hybrid system of the present modified embodiment. The hybrid system 1-2 is obtained by employing a speed change device 120 instead of the speed change device 20 in the hybrid system 1-1 of the above embodiment. Accordingly, even in the hybrid system 1-2, oil passages of hydraulic oils for a clutch CL1 and a brake BK1 are configured and placed in the same manner as in the hybrid system 1-1 of the above embodiment. In view of this, similarly to the above embodiment, the hybrid system 1-2 of the modified embodiment is able to improve mountability to a vehicle.

Here, the speed change device 120 of the modified embodiment includes a planetary gear unit, similarly to the above embodiment. The planetary gear unit exemplified herein is a double-pinion planet gear mechanism, and includes a sun gear S1, a ring gear R1, a plurality of pinion gears P1a, P1b, and a carrier C1, as a plurality of rotating elements (speed-changing rotating elements) that is able to rotate differentially. In the speed change device 120, any one of the sun gear S1, the ring gear R1, and the carrier C1 is connected to an engine ENG, and one of the others is connected to a differential device 30. In this embodiment, an engine rotating shaft 11 is connected to the ring gear R1 via a rotating shaft 22 so as to be rotatable integrally therewith. Further, in this embodiment, a carrier C2 of the differential device 30 is connected to the carrier C1 via rotating shafts 21, 31. Note that connected objects of the clutch CL1 and the brake BK1 are the same as in the above embodiment.

The invention claimed is:

1. A hybrid system comprising:
an engine including a rotating shaft;
a rotary machine including a rotor;
a speed change device including an input shaft and an output shaft, the input shaft being connected to the rotating shaft;
a differential device including a plurality of differential rotation elements including a first differential rotation element and a second differential rotation element, the first differential rotation element being connected to the output shaft, the second differential rotation element being connected to the rotor, and the differential device being configured such that the plurality of differential rotation elements is differentially rotatable relative to each other;
a first engaging device including a first engaging member and a second engaging member, the first engaging device being configured to shift gears of the speed change device by engaging or disengaging the first engaging member with or from the second engaging member;
a second engaging device including a third engaging member and a fourth engaging member, the second engaging device being configured to shift gears of the speed change device by engaging or disengaging the third engaging member with or from the fourth engaging member, the second engaging device including a cylinder member, the fourth engaging member of the second engaging device being disposed in the cylinder member, and the cylinder member being configured to support the first engaging device;
a casing configured to house the rotary machine, the speed change device, the differential device, the first engaging device, and the second engaging device, the casing being connected to the engine, the casing having an opening on an engine side, and the rotary machine being disposed on the engine side relative to the first engaging device and the second engaging device; and
a cover wall configured to cover the opening, the cover wall being connected to the cylinder member.

2. The hybrid system according to claim 1, wherein the first engaging device is disposed inside the cylinder member of the second engaging device in a radial direction.

3. The hybrid system according to claim 1, further comprising:
a first bearing disposed between the rotor and the cylinder member,
wherein the rotor of the rotary machine is configured to cover the cylinder member of the second engaging device in a radial direction,
the cylinder member includes a tubular portion,
the tubular portion and the rotor are configured to be supported by each other via the first bearing, and
the cover wall is connected to the tubular portion of the cylinder member.

4. The hybrid system according to claim 3, further comprising:
a spline joint provided between the tubular portion and the cover wall.

5. The hybrid system according to claim 3, wherein the tubular portion and the cover wall are connected to each other via splines provided on the tubular portion and the cover wall.

6. The hybrid system according to claim 3, further comprising:
a second bearing disposed between the tubular portion and the input shaft of the speed change device,
wherein the tubular portion is configured to cover the input shaft in the radial direction, and
the tubular portion and the input shaft are configured to be supported by each other via the second bearing.

7. The hybrid system according to claim 1, wherein the rotor of the rotary machine is connected to the second differential rotation element of the differential device via a connecting member, and
the connecting member is disposed outside the first engaging device and the second engaging device in a radial direction.

* * * * *